United States Patent [19]
Cleveland et al.

[11] Patent Number: 5,687,782
[45] Date of Patent: Nov. 18, 1997

[54] TRANSFER VALVE FOR A GRANULAR MATERIALS DISPENSING SYSTEM

[75] Inventors: Bruce W. Cleveland, Germantown; Albert M. Benedetti, Jr., Memphis; Richard Simon, Memphis; Paul A. Nolte, Memphis, all of Tenn.

[73] Assignee: Ingersoll-Dresser Pump Company, Liberty Corner, N.J.

[21] Appl. No.: 632,037

[22] Filed: Apr. 12, 1996

[51] Int. Cl.⁶ .................................................. B65B 1/06
[52] U.S. Cl. ......................... 141/346; 141/352; 141/360
[58] Field of Search ........................ 141/351–355, 141/360–362, 346; 251/291, 292; 137/271

[56] References Cited

U.S. PATENT DOCUMENTS 5,029,624  7/1991  McCunn et al. ........................ 141/346

*Primary Examiner*—J. Casimer Jacyna
*Attorney, Agent, or Firm*—Robert F. Palermo

[57] ABSTRACT

A transfer valve for permitting fluent particulate materials to flow from a closed transport container, having a bottom wall with an outlet aperture, into a closed base container having a top wall with a sealed inlet aperture adapted for sealed engagement with the bottom wall of the transport container; the transfer valve permitting operation without exposure of an operator to contact with the fluent particulate materials, comprises a transfer valve member having provisions for occluding the outlet aperture of the transport container; a further provision for latching and disabling the transfer valve member in a closed position; and another provision on the sealed base container, for enabling the disabled transfer valve member when the base container is in sealed engagement with the transport container. The base container is also equipped for dispensing particulate material from the base container at a controlled rate. Both the transport container and the base container are maintained closed until they are fully connected. When the valve is open, the transport container cannot be removed from the base container due to an interlock feature.

5 Claims, 4 Drawing Sheets

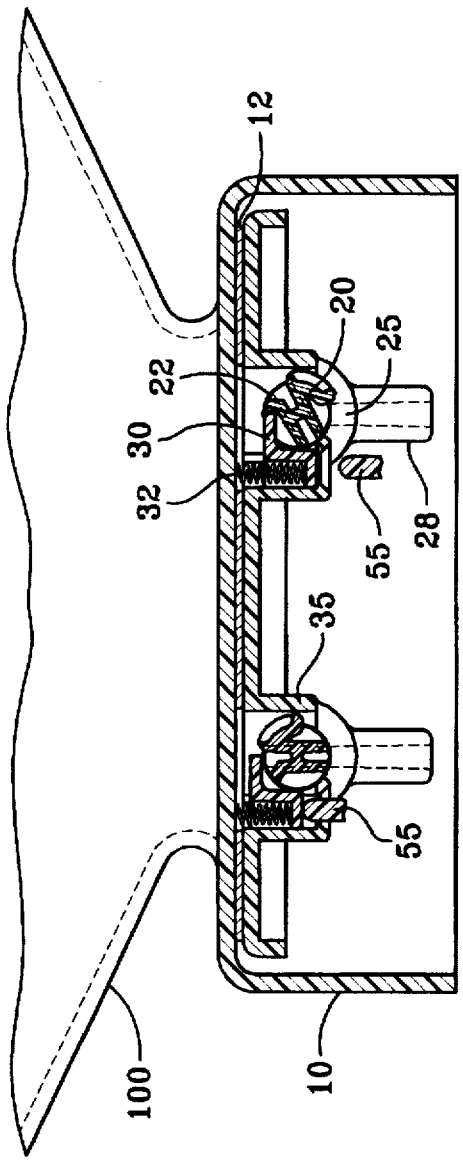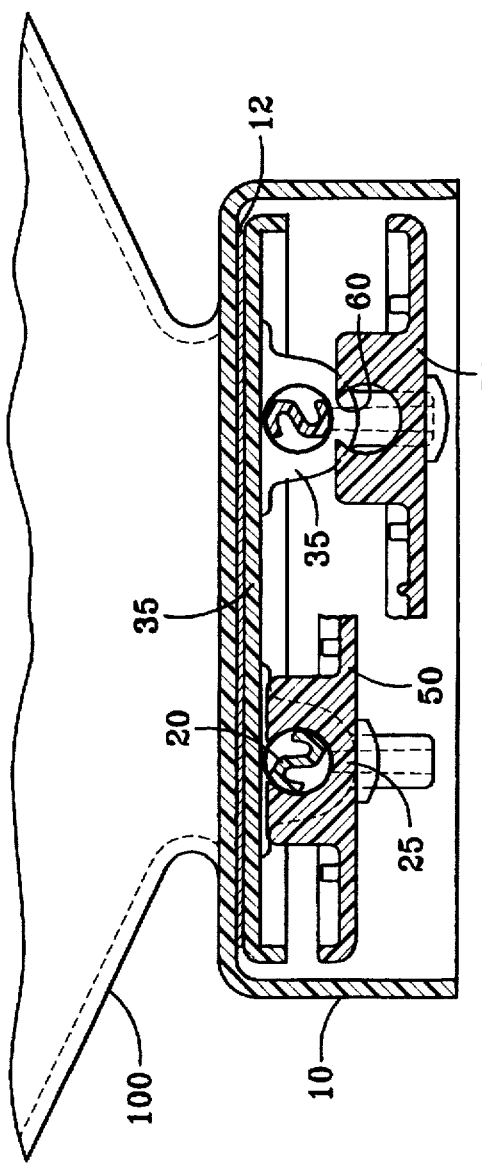

5,687,782

TRANSFER VALVE FOR A GRANULAR MATERIALS DISPENSING SYSTEM

BACKGROUND OF THE INVENTION

This invention relates generally to handling equipment for particulate materials and more particularly to a transfer valve for use in a spill-resistant system for transporting and dispensing hazardous granular or particulate materials.

In operations requiring hazardous chemicals or other noxious substances, there is a need for products and systems which address proper handling of hazardous chemicals. This need is addressed in co-pending U.S. patent application, Ser. No. 08/394,076, filed Feb. 24, 1995, which is incorporated herein, by reference. The system described includes a closed chemical shipping container together with a connection and dispensing apparatus which does not expose the operator to the chemicals and which accurately controls dispensing of the chemicals. The present invention represents an enhancement to the transfer valve disclosed in that application and provides desirable performance improvements thereto.

It is important to avoid dispensing losses because of the high cost of the chemicals and to avoid spillage of even small amounts of pesticides while opening the containers, while pouring the chemical into the dispensing equipment, or while connecting and disconnecting the chemical shopping (or transport) containers and the dispensing equipment when the unit is so equipped. Even a small quantity of accidentally dispensed chemical may result in a significant cost penalty; because the toxicity of pesticides may result in serious environmental damage and in adverse health consequences for exposed persons. For this reason, the transfer valve arrangement is very important; because the transfer valve may contribute to spillage, to incomplete emptying of the shipping container; and to uneven dispensing of the chemical product.

The foregoing highlights the importance of reliability in all aspects of present chemical transporting and dispensing systems. Thus, it would be advantageous to provide an improvement directed to enhancing reliability and performance of any aspect of these systems. Accordingly, a practical and useful improvement is provided including features more fully disclosed hereinafter.

SUMMARY OF THE INVENTION

In one aspect of the present invention, this is accomplished by providing a transfer valve for permitting fluent particulate materials to flow from a closed transport container, the transport container having a bottom wall with an outlet aperture, into a closed base container having a top wall with a sealed inlet aperture adapted for sealed engagement with the bottom wall of the transport container; the transfer valve permitting operation without exposure of an operator to contact with the fluent particulate materials, including a transfer valve member having means for occluding the outlet aperture of the transport container; means for latching and disabling the transfer valve member in a closed position; and means on the sealed base container for enabling the disabled transfer valve member, when the base container is in sealed engagement with the transport container.

The foregoing and other aspects will become apparent from the following detailed description of the invention when considered in conjunction with the accompanying drawings.

BRIEF DESCRIPTION OF THE DRAWINGS

FIG. 4 is a schematic transverse cross-sectional elevation view of a transfer valve in latched and unlatched positions according to the present invention;

FIG. 5 is a transverse cross-sectional elevation view showing the base container plate in sealed engagement with and disengaged from the transfer valve body mounted on the transport container;

DETAILED DESCRIPTION

Figure 1:
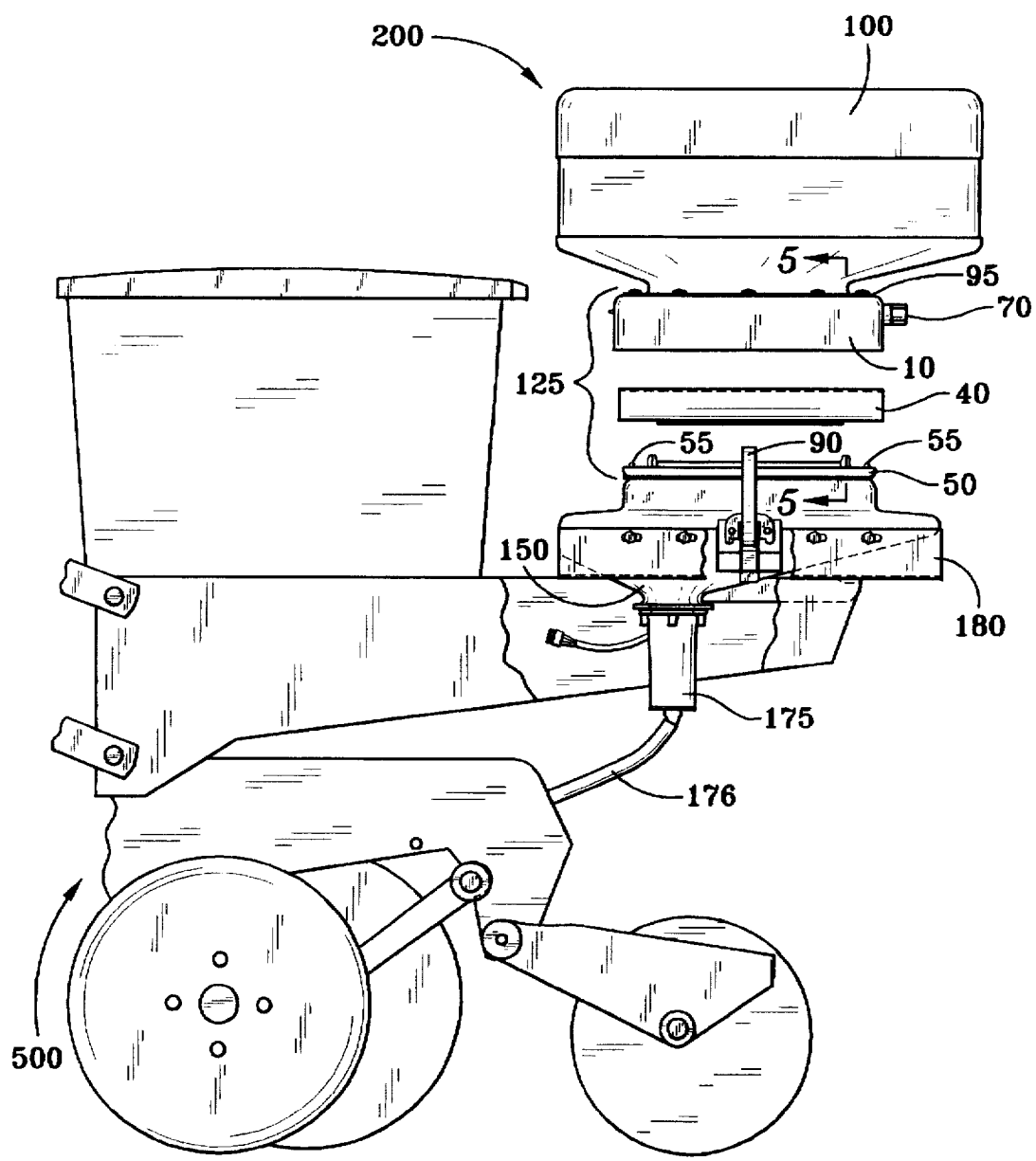
FIG. 1 is a fragmentary side view of an agricultural implement with a granular material dispensing system incorporating the transfer valve of the invention.
Figure 2:
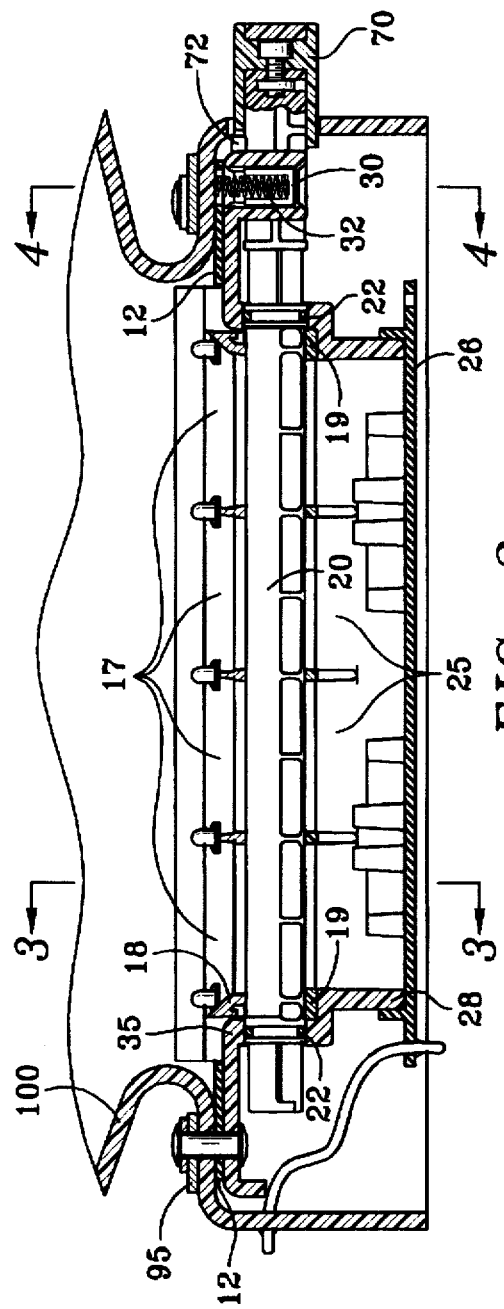
FIG. 2 is a longitudinal cross-sectional elevation view of a single valve of the transfer valve member of the invention attached to a transport container.
Figure 3:
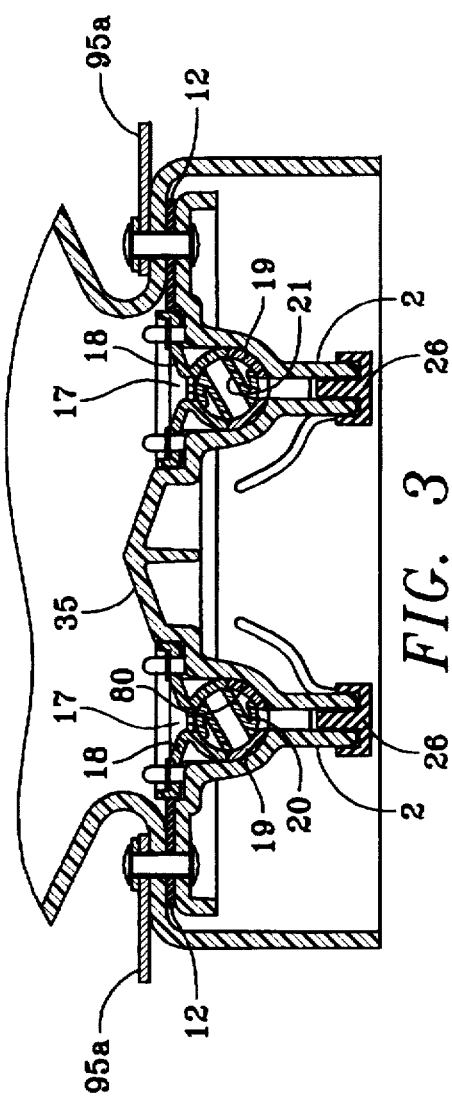
FIG. 3 is a transverse cross-sectional view of a preferred dual transfer valve.

FIG. 1 shows an agricultural implement 500 upon which is mounted a chemical dispensing system for granular materials 200 which includes the transfer valve of the invention. The main components of the dispensing system 200 are the transport container 100, the transfer valve 125, the base container 150, and the dispensing valve 175. The base container 150 is mounted to the implement 500 on the cradle 180, the dispensing valve 175 is mounted to the base container 150, and the transport container 100 with the transfer valve 125 is mounted on the base container 150 and secured in place by clamps 90. The primary feature of the dispensing system is that the operator does not have contact with the chemicals being dispensed; because the transport container 100 is sealed and covered during transportation, the base container 150 is sealed and covered when not in use, and the transfer valve 125 is disabled whenever the containers are not connected and properly clamped together. Even while dispensing there is no contact since the chemical dispensed by valve 175 travels through tube 176 to be deposited in the furrow which is closed by a trailing wheel or disc. Details of the transfer valve 125 are best illustrated by considering FIGS. 1, 2, 3, and 7 together.

The transfer valve includes the components within the shroud 10 and the valve handles 70, the rubber seal 40, and the base plate 50. The support bracket 95 and the clamps 90 can also be considered to be part of the valve 125, since they are required to ensure firm and correct connection between the transport container 100 and the base container 150 in order to enable and operate the transfer valve. The covers 26 are provided to protect the bottoms of the discharge ports during shipping, to prevent release of chemical residues, and to prevent the ingress of foreign materials when not in use.

The preferred embodiment of the transfer valve 125 comprises two parallel semi-cylindrical compliant valve seats 19 installed in the bottoms of two valve chambers 80. The valve seats 19 each have a number of discharge slots (not numbered) in alignment with the chemical discharge ports 25 at the bottoms of the valve chambers 80 in the valve housing 35. The compliant seats act as seals between the molded valve rods 20 and the molded valve chambers 80 of the housing 35. They flex to accommodate any surface discrepancies between the rods 20 and the valve chambers 80, as well as any particles of chemical which may become caught between the valve rods 20 and the seats 19; when the valve rods are rotated between the open position, with the valve rod passages 21 aligned with the discharge slots of the seats 19 and the discharge ports of the valve housing 35; and the closed position, with the valve rod passages blocked by the seats 19. A rigid valve retainer 18 is fastened to the valve housing 35, over each valve chamber 80, and secures the valve rod 20 and the valve seat 19 therein. At each end of each valve rod 20 is an O-ring 22 which seals around the rod where it enters the valve chamber. The discharge ports 25 below the valve chambers 80 are bounded by discharge nozzles 28 which are narrow walled slotted projections from the bottom of the valve housing 35 below the valve chambers. The covers 26 are made to fit in the discharge nozzles for shipping.

At one end of each valve rod 20 is a handle 70 which is keyed to the rod for turning. Each handle 70 has a sleeve which overlays the end of the rod and from which about a ¼ inch deep portion of the wall is removed from about ⅓ of the circumference of the sleeve to create a notch 73 which acts with a projection 72 from the end of the valve housing 35 to limit the rotary motion of the handle 70 and the valve rod 20. The rod has about 60° of motion between the closed position, in which the retainer ports 17 and the discharge ports 25 are blocked by the valve rod 20, and the open position, in which the valve rod ports 21 are aligned with both the retainer ports 17 and the discharge ports 25. A valve rod latch 30 is biased by a spring 32 and engages the valve rod 20 to prevent opening the valve unless the valve housing member is properly installed on the base plate 50. Operation of the latch will be addressed below.

The valve housing 35 is attached to the transport container 100 with a gasket 12 interposed therebetween and a support bracket 95 behind the shoulder of the shroud 10 to act as a reinforcement and a load distributor. The support bracket 95 also has laterally overhanging projections 95a which are engaged by the clamps 90 to secure the transport container 100 to the base container 150 in the operating position.

Other features of the transfer valve 125 and its operation are described with reference to FIGS. 4–7. FIG. 4 illustrates the valve rod latching arrangement looking in the direction of the arrows 4—4 in FIG. 2. The disabling and locking feature are illustrated in the right-hand valve, in which the valve rod 20 is shown rotated to its closed position and the latch 30 is shown biased by the spring 32 to its valve disabling position. The left-hand valve shows the valve enabled by the boss 55, of the transfer valve base plate mounted on the base container assembly, which has displaced the latch 30 from its disabling position against the bias of the spring 32 and allowed rotation of the valve rod 20 to its open position, as shown.

FIG. 5 shows another transverse cross-section of the transfer valve, viewed in the direction of arrows 5—5 in FIG. 1, to illustrate an interlock feature. Valve rod 20 presents a narrow profile when in its closed position, as seen in the right-hand valve, and a wide profile when in its open position, as seen in the left-hand valve. The base container plate 50 has cylindrical longitudinal passages in upwardly projecting portions which are cut away on chords of the cylinders near the tops of the upward projections to form narrow longitudinal openings or slots 60 into the cylindrical passages. There is one of these projections to engage with the valve rod 20 at each end of each valve chamber 80. When the transport container 100 is installed, with the valve rods 20 in the closed position, on the base container, the base container plate 50 engages with the valve housing 35 and the valve rods 20 slide through the narrow slots 60 until the plates are fully engaged. When fully engaged, as seen in the left-hand valve, the valve rod 20 is free to turn within the cylindrical passage to open the valve. In the open position, the valve rod 20 cannot pass through the slot 60, and the valve housing member and valve base plate member cannot be separated. This helps to assure that the transport container 100 cannot be removed from the base container while the valves are open.

Figure 6:
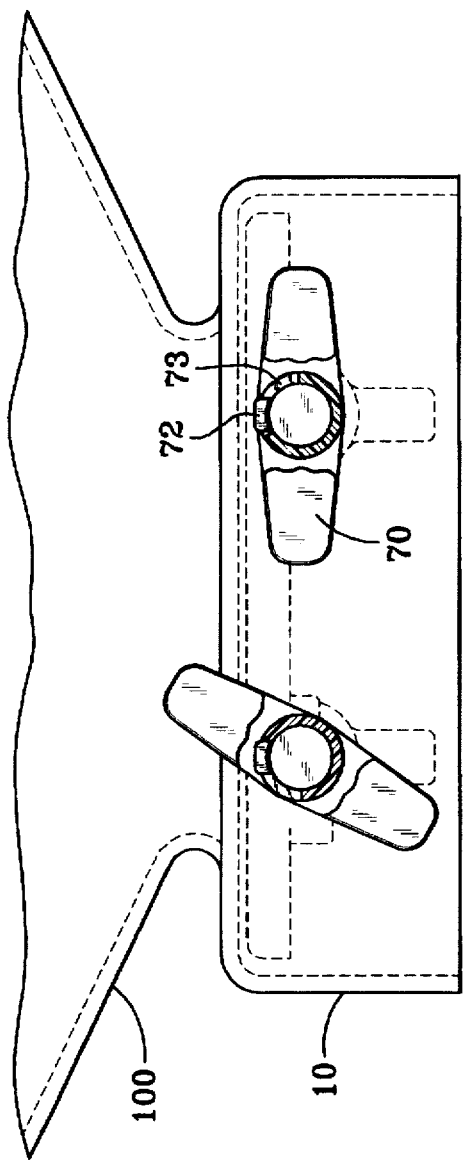
FIG. 6 is a transverse end view showing valve handles in closed and open positions.

FIG. 6 is an end view of the transfer valve in which is seen the transfer container 100, the protective base shroud 10, and valve handles 70. The valve handles 70 are cut away to show portions of the sleeves which have notches 73 at their distal ends, of approximately 120° radially and ¼ inch axially, which engage with projections 72 on the valve housing, to act as stops for opening and closing the valves by limiting the turning freedom of the valve handles 70.

Figure 7:
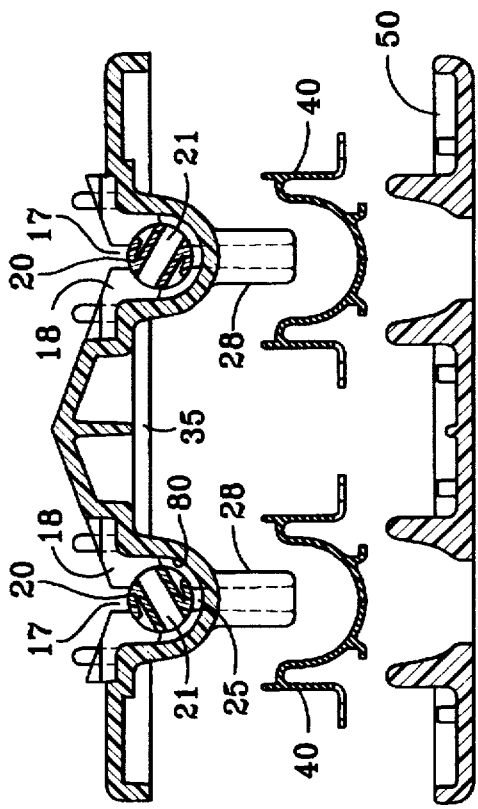
FIG. 7 is a transverse cross-sectional exploded elevation view showing the valve housing, the seal, and the base container plate of the transfer valve.

FIG. 7 is an exploded cross-sectional view showing further details of the transfer valve. The valve housing 35 is shown with the two valve rods 20 in their closed positions, in which valve ports 21 are not aligned with chemical discharge ports 25. Base member plate 50 and congruently shaped flexible seal 40 are shown in alignment with the valve housing 35. When assembled, the chemical discharge nozzles 28 project downward through slits in the flexible seal 40. The valve housing 35, the congruently shaped flexible seal 40, and the valve base member plate 50 nest firmly together in a sealed engagement. The flexible seal 40 prevents leakage when the valve housing and the base member plate are engaged, and, when separated, the elastic memory of the flexible seal 40 closes the slits and seals the base valve base member plate 50.

The invention provides a transfer valve for draining granular materials from a transport container with a normally disabled transfer valve into a base container with means for enabling the transfer valve. The rotary valve rod in a cylindrical valve body provides smooth operation without jamming.

Having described the invention, we claim:

1. A transfer valve for permitting fluent particulate materials to flow from a closed transport container, said transport container having a bottom wall with an outlet aperture, into a closed base container having a top wall with a sealed inlet aperture adapted for sealed engagement with the bottom wall of said transport container; said transfer valve permitting operation without exposure of an operator to contact with said fluent particulate materials, comprising:

a transfer valve member having a valve body in sealed attachment to said transport container, said valve body having a plurality of discharge ports controlled by at least one valve rod rotatable between open and closed positions in said discharge ports, and latch means for engaging and disabling said valve rod in said closed position to prevent rotation of said rod from said closed position; and means on said sealed base container for enabling said disabled valve rod, when said base container is in sealed engagement with said transport container.

2. The transfer valve of claim 1, further comprising:

support bracket means on said transport container; and means on said base container for engaging with said support bracket means and for clamping said base container to said transport container.

3. The transfer valve of claim 1, further comprising:

means on said sealed base container for permitting engagement of said transfer valve member with said means for enabling said disabled valve rod when said valve rod is in a closed position and for preventing disengagement of said transfer valve member from said means for enabling when said valve rod is in an open position.

4. The transfer valve of claim 1, wherein the means for latching and disabling said valve rod in a closed position comprises at least one latching dog reciprocally mounted in said transfer member adjacent said valve rod and normally biased into locking engagement with said valve rod when said valve rod is in the closed position to prevent rotation of said valve rod to the open position.

5. The transfer valve of claim 4, wherein the means on said base container for enabling said disabled valve rod, when said base container is in sealed engagement with said transport container, comprises at least one boss on the base container projecting toward the transfer valve member and engaging the latching dog to overcome the bias of said latching dog and to disengage said latching dog from said valve rod.

* * * * *